United States Patent [19]

Dono et al.

[11] Patent Number: 4,733,060
[45] Date of Patent: Mar. 22, 1988

[54] CHECK NEGOTIATION SYSTEM BY MEANS OF CHECK CARDS AND CHECK CARD DRAWING APPARATUS

[75] Inventors: Syugo Dono; Fumio Miyanaga; Hiroshi Tomiyama; Sadaaki Uesaka; Haruo Odagiri, all of Himeji, Japan

[73] Assignee: Glory Kogyo Kabushiki Kaisha, Himeji, Japan

[21] Appl. No.: 680,649

[22] Filed: Dec. 11, 1984

[30] Foreign Application Priority Data

Dec. 16, 1983 [JP] Japan ............................... 58-237275

[51] Int. Cl.$^4$ .............................................. G06F 15/30
[52] U.S. Cl. ................................. 235/379; 235/58 CW; 235/449; 235/432
[58] Field of Search .......... 235/379, 380, 493, 58 CW, 235/449; 360/2

[56] References Cited

U.S. PATENT DOCUMENTS

| | | | |
|---|---|---|---|
| 3,869,700 | 3/1975 | Cook et al. | 235/380 |
| 3,946,202 | 3/1976 | Taniguchi et al. | 235/380 |
| 4,341,951 | 7/1982 | Benton | 235/379 |
| 4,450,348 | 5/1984 | Stockburger et al. | 235/493 X |
| 4,454,414 | 6/1984 | Benton | 235/379 |
| 4,544,834 | 10/1985 | Newport et al. | 235/380 |
| 4,562,340 | 12/1985 | Tateisi et al. | 235/379 |

Primary Examiner—David L. Trafton
Attorney, Agent, or Firm—Wenderoth, Lind & Ponack

[57] ABSTRACT

In commercial transactions, settlement is conventionally made by cash and by checks drawn on a current account in a bank, etc. Users of such checking system enjoy its advantages. From the standpoint of banking business, however, such system involves a vast amount of complicated clerical procedures, and a number of negotiation checks pose a bottleneck in rationalizing the banking business. According to the present invention, there is provided a safe and secure check negotiating system which enables checks to be cashed with a minimum manual handling once check has been received by a financial institution such as a bank. The present invention also aims to provide a novel check card and an apparatus for drawing check cards to prevent illicit use of such a card when lost or stolen.

9 Claims, 5 Drawing Figures

CHECK NEGOTIATION SYSTEM BY MEANS OF CHECK CARDS AND CHECK CARD DRAWING APPARATUS

BACKGROUND OF THE INVENTION

The present invention relates to a check negotiation system using a check card which is provided with a magnetic stripe to store prescribed data and to an apparatus for drawing a check card.

In commercial transactions, settlement is conventionally made by cash or by checks drawn on a current account in a bank, etc. Users of such checking system enjoy its advantages. From the standpoint of banking business, however, such system involves a vast amount of complicated clerical procedures, and a number of negotiation checks pose a bottleneck in rationalizing the banking business.

We will now briefly refer to the procedure for handling checks at a bank, etc. A user such as a firm or an entrepreneur opens a current account with a bank based on which the bank issues a check book containing a number of checks printed with the user's account number (including the bank and branch codes) by means of, for example, magnetic ink character recognition (MICR). The user draws a check by writing a sum of money by hand or by a check-writer. The recipient then submits the check to a clerk at his/her bank to be deposited in his account. The bank first records all such checks on a microfilm and then print thereon the respective amount using an MICR encoder. The checks then are sorted out into their own checks and other bank checks. Those checks issued by other banks are stamped for clearing and are brought to a regional clearing house to which the bank (or branch) belongs. Checks from different banks collected at the clearing house are sorted out according to banks by means of an MICR reader/sorter, and a balance sheet of different banks is also made. Each bank takes back its checks and confirms the balance of the drawer's account. This is done within a predetermined period of time (i.e., one day after clearing). For the cases with insufficient fund in the account during this period, the bank which received such checks is notified of the conditions so that the amount thereof is credited to the bearer's account. Upon expiration of such period, the drawn amount is automatically credited to the bearer's account in other cases and the bank concerned settles payment according to the balance sheet mentioned above. As for the own checks issued by themselves, the fund of the drawer's account is confirmed by means of an on-line system and if sufficient, the check is honored and credited to the bearer's account.

As mentioned above, conventional check negotiation system involves complicated and multiple procedure of both manual and mechanical steps. There is also a risk of illicit use if the check book mentioned above is lost or stolen and the loss or theft thereof is not reported to the bank immediately.

SUMMARY OF THE INVENTION

The present invention aims to provide a safe and secure check negotiating system which enables checks to be cashed with a minimum manual handling once a check has been received by a financial institution such as a bank. The present invention also aims to provide a nobel check card and an apparatus for drawing check cards to prevent illicit use of such a card when lost or stolen.

According to the present invention for achieving the objects described above, in one aspect thereof, there is provided a check negotiation system using check cards characterized by the steps of inserting a check card into a check card drawing apparatus for processing the same by inputting necessary data such as the sum of money, identifying the genuineness of the check card to draw a check, inserting said drawn check card into a bank note/coin processor such as automatic cash dispensing machine, automatic cash depositing/dispensing machine and teller's machine to judge its genuineness, and cashing or crediting the inputted sum of money to a designated account.

In another aspect of the present invention, there is provided a check card drawing apparatus which comprises a keyboard for data input operation; a display means to display the data inputted by said key-board; a data read-out/write-in means to read out the data written on the check card inserted through an insertion slit and to write in necessary data on said check card; a printing means to print data at a predetermined position on said check card; and a control means which controls said keyboard, said display means, the data read-out/write-in means and said printing means as well as controlling and conveying of said check card from the insertion slit to the ejection slit.

The nature, principle and utility of the invention will become more apparent from the following detailed description when read in conjunction with the accompanying drawings.

BRIEF DESCRIPTION OF THE DRAWINGS

In the accompanying drawings

DETAILED DESCRIPTION OF THE INVENTION

Figure 1:
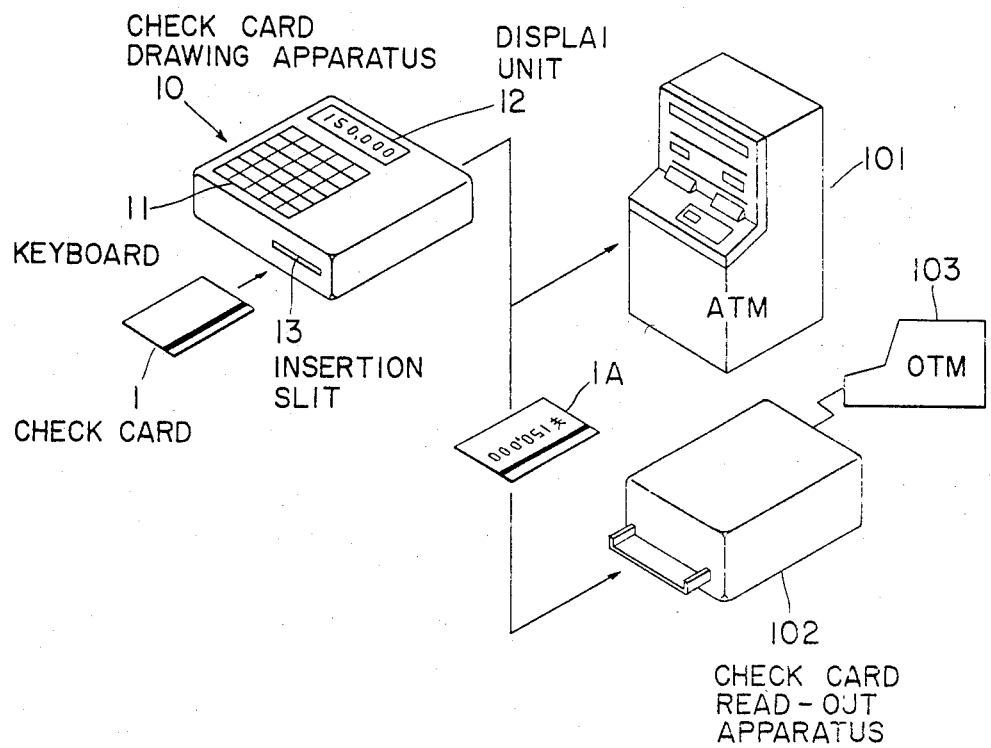
FIG. 1 is a view showing one example of the check negotiating system according to the present invention.
Figure 2:
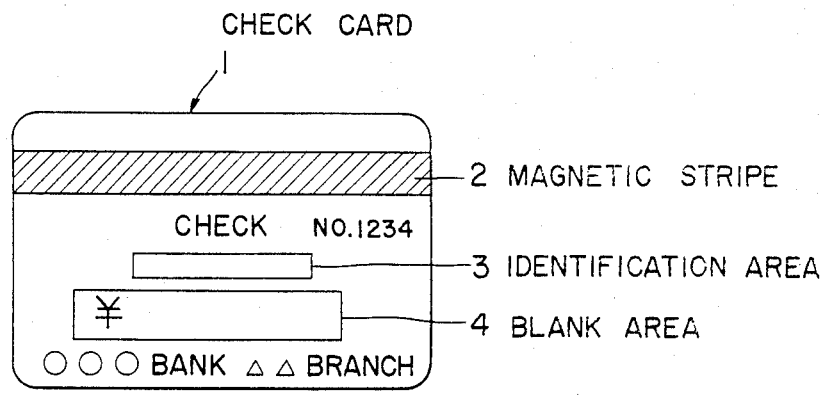
FIG. 2 shows the appearance of a check card to be used in the present invention.

Referring to FIG. 1 which shows the check negotiating system according to the present invention using a check card 1, a person who holds a current account at a bank writes in necessary data such as the amount on the check card 1 provided by the financial institution in advance, and draws a check (check card 1A) using a portable and compact check card drawing apparatus 10. The check card 1 is a rectangular sheet similar to those widely used as a cash card (quick card, bank card, etc.) provided with a magnetic stripe 2 on its surface for writing-in and reading-out data as shown in FIG. 2. The check card 1 may be made of hard paper or plastic provided at a predetermined position with an identification area 3 to optically read out identification characteristics specifically assigned to each check card 1. Below the identification area 3 is a blank area 4 for printing out the amount of a check. Characteristic data in the identification area 3 of the check card 1 may be read out by a characteristic reading-out device and/or reading-out method such as those described in the Japanese patent Laid-open Nos. 97187/1982 and 97188/1982. The characteristic data specific for each check card 1 is read out and recorded on the magnetic stripe 2 before the check card 1 is handed out to a user who has opened a current account. The user's account number is also recorded on the magnetic stripe 2. The area 4 for printing the amount in a check not yet drawn is naturally left blank.

A check card 1 as described above is inserted into an insertion slit 13 provided on the front side of the drawing apparatus 10, and taken in by means of a conveying mechanism to be described later. Necessary data is inputted by means of a keyboard 11 comprising ten keys and symbol keys. The user can write out a check confirming the figure (amount) indicated on a display unit 12 which is provided at upper portion of the keyboard 11. When all the input operation is completed and the confirmation-key is pressed, the drawn amount on the keyboard 11 is printed in the area 4 and a check (check card 1A) with the amount and so on recorded on the magnetic stripe 2 is ejected from an ejection slit of the drawing apparatus 10. The check card 1A is then delivered to the drawee (creditor) by the drawer.

A user who has received a check card 1A thus drawn inserts the same into an insertion slit which may be provided exclusively or the slit for inserting cash card may be used by an automatic teller's machine (ATM) for automatically paying into his account via an on-line system. In the case where the check card has been issued within the same branch of a bank, it can be cashed on the spot. By inserting the check card 1A into an exclusive check card read-out apparatus 102 connected to an on-line teller's machine (OTM) 103 installed at teller's window, the check card 1A can be credited to the bearer's account by on-line system. When a check card is to be credited to an account or cashed via ATM 101 or OTM 103, whether there remains sufficient fund in the drawer's account is essential. Therefore, the check processing apparatus enables confirming the fund in the drawer's current deposit via ATM 101 or OTM 103 and allows crediting or cashing for an amount of money within the limit of the fund. When a drawer wishes to write in the amount on the check card 1 by the drawing apparatus 10 without knowing for sure how much fund is in his account, he may refer directly to the bank by telephone or the like, or the fund may be checked automatically by connecting an acoustic coupler to the check card drawing apparatus 10. This way, a check card may be surely drawn within the limit.

Figure 3:
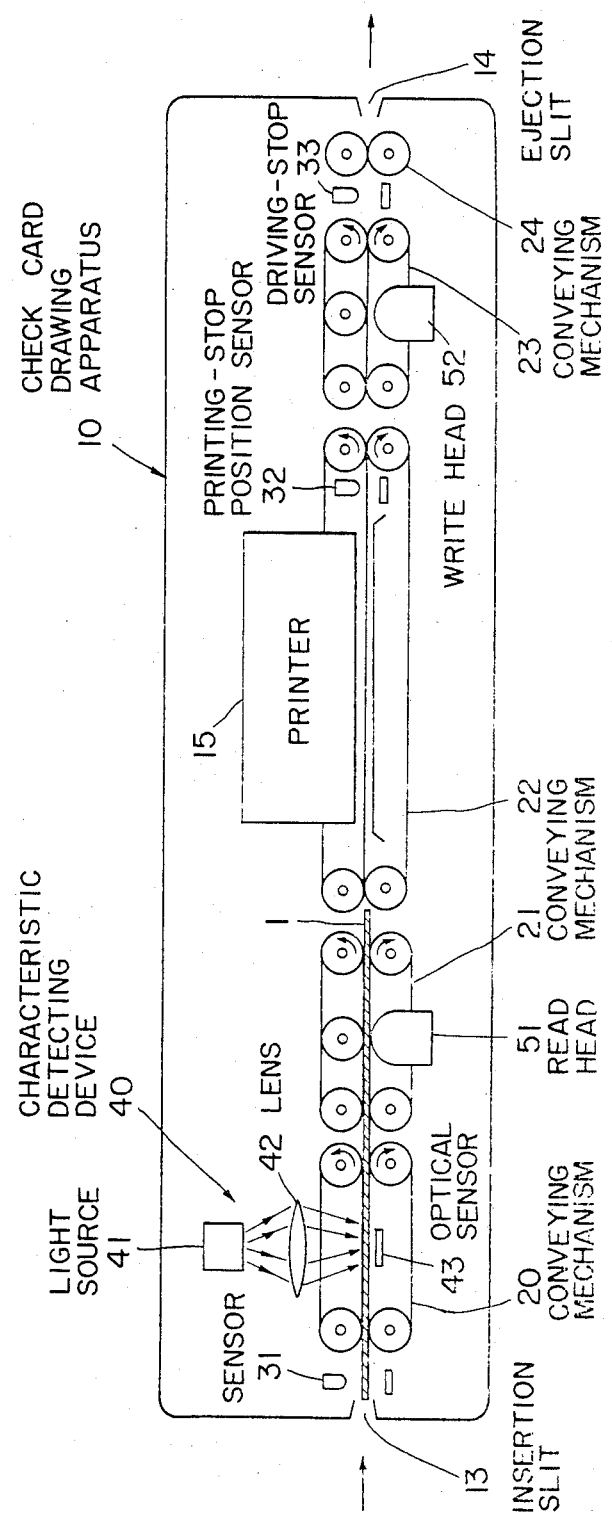
FIG. 3 is a schematic view showing a structure of the check card drawing apparatus.
Figure 4:
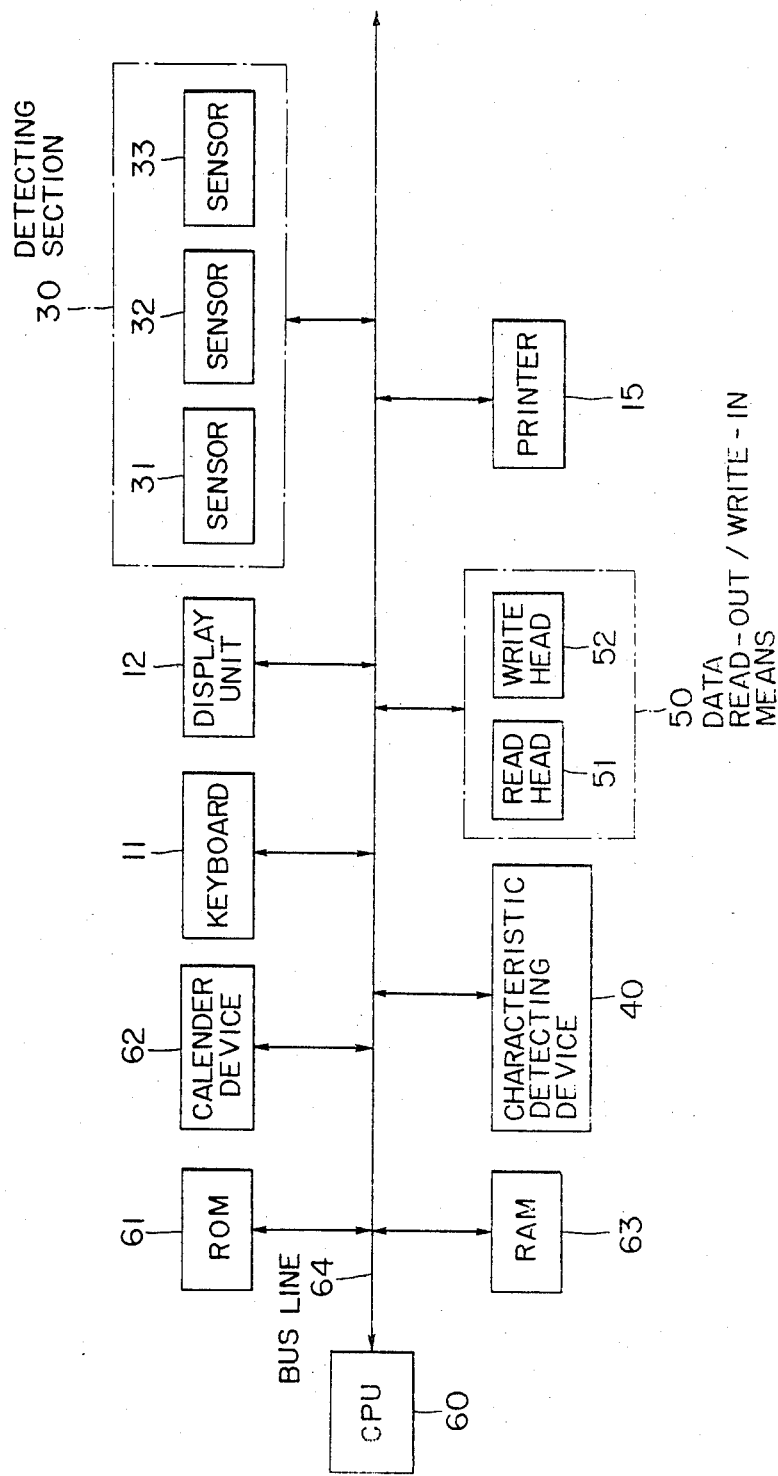
FIG. 4 is a block diagram of the control device.

FIG. 3 shows a schematic diagram of the check card drawing apparatus 10 and FIG. 4 a block diagram to show its control system.

The check card 1 inserted into an insertion slit 13 is conveyed to an ejection slit 14 via a conveying mechanisms 20 to 24 driven by a motor. The conveying mechanisms 20 to 23 convey the check card 1 which is interposed between a pair of upper and lower belt conveyors wound around a pair of rollers, respectively. A sensor 31 comprising a light emitting element and a photo-sensitive element is provided immediately adjacent to the insertion slit 13 for optically detecting insertion of a check card. A printing-stop position sensor 32 comprising a light emitting element and a photo-sensitive element is provided at the rear of the conveying mechanism 22 for detecting the check card 1 taken in and stopping the same at a predetermined position for printing. At an intermediate point between the conveying mechanisms 23 and 24, a driving-stop sensor 33 is provided to detect that the check card 1 has been ejected from the ejection slit 14 and to stop the conveying mechanisms 20 to 24 for a predetermined period of time. These sensors 31 to 33 constitute a detecting section 30. A characteristic detecting device 40 is provided at an intermediate position of the conveying mechanism 20 for reading out an optical characteristics specific for the inserted check card 1. The light emitted from a light source 41 is illuminated via a lens 42 on the check card 1 being conveyed by the conveying mechanism 20. The light penetrated through the identification area 3 of the check card 1 is detected by an optical sensor 43 comprising such device as a charge coupled device (CCD). The detection method described in the Japanese patent Laid-open Nos. 97187/1982 and 97188/1982 is also applicable to the characteristic detecting device 40. A read head 51 is provided at the mid-portion of the conveying mechanism 21 for reading out the data written on the magnetic stripe 2 of the check card 1 and a write head 52 is provided in the conveying mechanism 23 for writing the data processed by a control system to be described later on the magnetic stripe 2 of the check card 1. The read head 51 and write head 52 constitute a data read-out/write-in means 50. The conveying mechanism 22 is provided with a printer 15 to print the data inputted by the keyboard 11 onto the area 4 of the check card 1. The conveying mechanism is halted when the printer 15 is actuated for printing.

In the block diagram shown in FIG. 4, CPU 60 (such as a micro-computer) functions for overall control in the system. Operational program to be described later is stored in ROM 61 while characteristic data detected by the characteristic detecting device 40 and data inputted by the keyboard 11 are stored in RAM 63 to be read out and processed whenever necessary. A calender device 62 comprises a clock circuit for storing the chronological data (including the time, date and the day of the week) on a check card which is drawn by the check card drawing apparatus 10 or for writing the drawing time on the check card 1. ROM 61, the calender device 62, RAM 63 and the keyboard 11 are connected to CPU 60 via a bus line 64.

Figure 5:
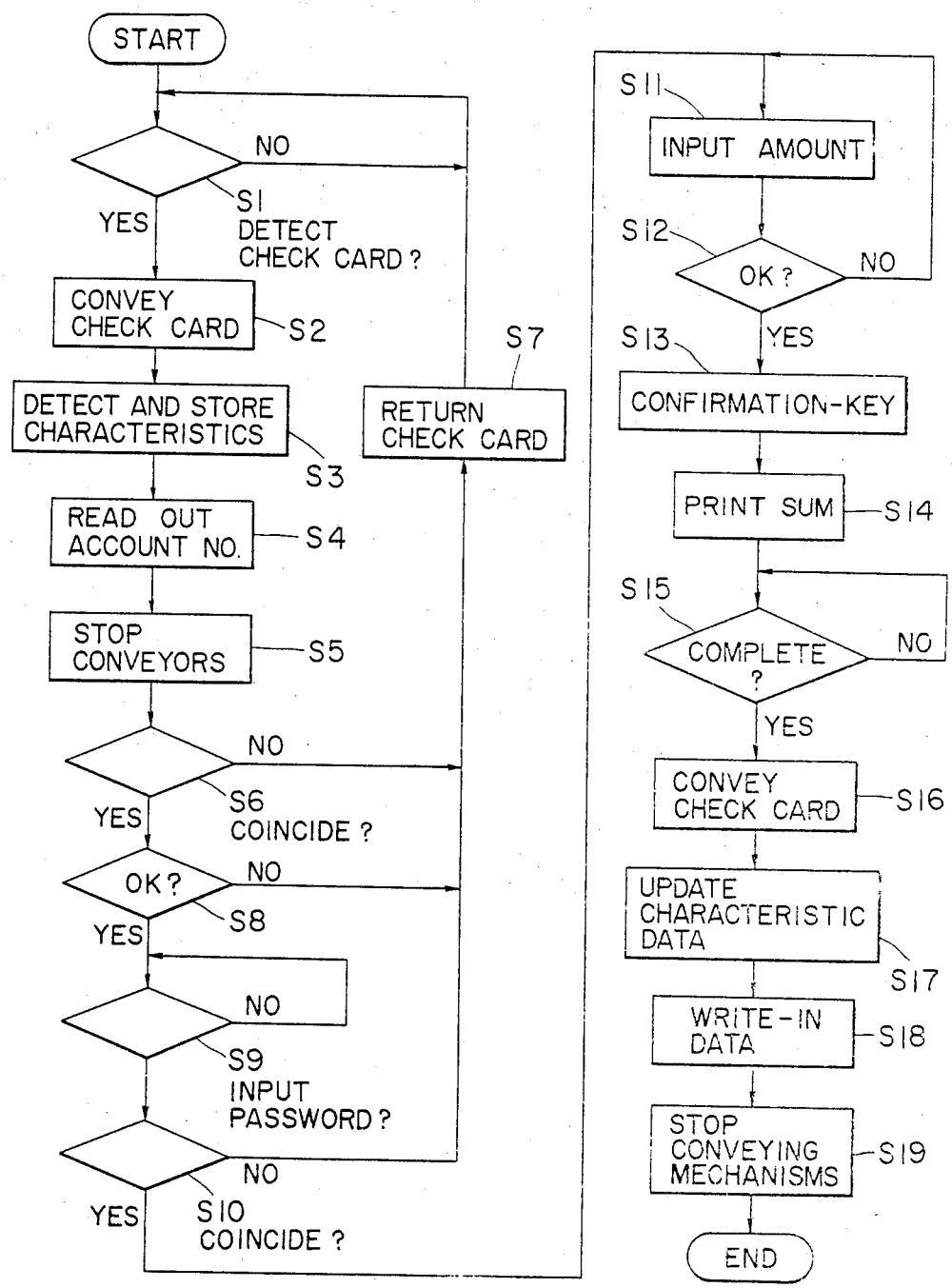
FIG. 5 is a flow chart showing one example of operation according to the present invention.

The operation of the check card drawing apparatus 10 will now be described referring to the flow chart of FIG. 5.

For drawing a check using the check card drawing apparatus 10, a drawer inserts into the insertion slit 13 the check card 1 given to him in advance by a financial institution such as bank. The sensor 31 detects the tip of the inserted check card 1 (step S1) and then CPU 60 drives the conveying mechanisms 20 to 24 to send the check card 1 in the drawing apparatus 10 (step S2). The characteristic detecting device 40 provided at the mid-portion of the conveying mechanism 20 optically reads out the characteristics specific for the inserted check card 1 and the read-out data is stored in RAM 63 (step S3). The drawer's account number recorded in the magnetic stripe 2 is read out by the read head 51 provided at the mid-portion of the conveying mechanism 21 (step S4). When the tip of the check card 1 reaches the printing-stop position sensor 32 for printing, the conveying mechanisms 20 to 24 are halted by means of CPU 60 (step S5). Then, CPU 60 judges whether the account number alloted by the bank in advance coincides with the account number read out by the read head 51 (step S6) as well as whether the characteristic data actually detected by the detecting device 40 coincides, perfectly or with allowable error, with the characteristic data which has been detected and recorded on the magnetic stripe 2 before it is given to the drawer by the financial institution (step S8). In the case where the account number does not coincide and the characteristic data does not coincide or fall out of the allowable error, the conveying mechanisms 20 to 24 become reversed to return the check card 1 through CPU 60 (step S7).

On the other hand, in the case where the account number coincides and the characteristic data either coincides or falls within the allowable error, the drawer inputs via the keyboard 11 a password (such as secret numbers) agreed in advance between the drawer and the financial institution when the account was opened (step S9). If the password is correct, the amount in the check to be drawn is inputted via the keyboard 11. If the inputted password is incorrect, the drawer is judged as someone other than the one agreed by the financial institution. The check card 1 is therefore rejected as the conveying mechanisms 20 to 24 are reversed as described above (step S7). The amount of money inputted via the keyboard 11 is indicated on the display unit 12 provided at the upper portion of the drawing apparatus 10 and comprising a liquid crystal display, and the drawer confirms whether the displayed figures are the amount to be actually drawn out in check or not (step S12). If the amount is correct, the confirmation-key on the keyboard 11 is pressed (step S13), whereby the printer 15 is actuated by means of CPU 60 to print out the sum in figures on the area 4 of the check card 1 which has been taken in the drawing apparatus 10 and halted (step S14). The reason why the amount is printed out on the area 4 of the check card 1 visibly is because otherwise the user who receives the check card feels insecure and the credibility of the check card may be at stake.

When the printing operation using the printer 15 is completed (step S15), the conveying mechanisms 20 to 24 are actuated by CPU 60 and send the check card 1 toward the ejection slit 14 (step S16); in the meantime, the sum data stored in RAM 63 and the chronological data outputted from the calender device 62 are respectively written on the magnetic stripe 2 via the write head 52. New characteristic data detected by the detecting device 40 and stored in RAM 63 are written in a prescribed area on the magnetic stripe 2 to update the data (step S17). This is done because the check card 1 may get soiled in the course of transaction and it is necessary to store the latest data. At the same time, chronological data concerning drawing from the calender device 62, the drawn amount and so on are stored in the predetermined area of RAM 63, whereby transaction state for a day or check drawing state for one month may be tabulated and printed out by the printer 15 to ensure safe and smooth drawing (step S18). When the check card 1 is ejected from the ejection slit 14 and the sensor 33 detects the tail end of the check card 1, the driving of the conveying mechanisms 20 to 24 is stopped by CPU 60 (step S19), whereby the drawing operation of the check card 1 is completed.

In the above mentioned embodiment, the check card 1 is made of hard paper or plastic. Any material which reads out the characteristic data may be used with modifications as well as the shape or the recording position of the check card may be optional. For example, the other materials applicable to the check card of the present invention are shown in Japanese Patent Laid-open No. 117081/1982, Japanese patent Publication No. 41549/1983 and German Offenlegungsschrift No. 3415798. In the check card drawing apparatus mentioned above, the account number of the user is written in ROM and the account number is read out and collated with the account number written on the inserted check card to confirm whether the two numbers coincide with each other or not. However, it is possible to input the account number using the keyboard. The shape is optional, and configuration of the apparatus, the position of keyboard or display and the position of insertion and ejection slits for the check card also may be made artibrarily so long as the apparatus possesses the functions explained in connection with FIGS. 3 and 4. For example, the insertion slit may double as the ejection slit in this case, and the check card drawing apparatus may be reduced in its size. Various bank note processors such as teller's machine may also be used other than ATM and OTM as an apparatus to receive the drawn check card.

As has been mentioned in the foregoing, the check negotiation system according to the present invention enables prompt and secure processing of a check both for drawing out and receiving the same at a financial institution, and rationalizes the check negotiating procedure. The characteristic data assigned to each check card is safeguarded against illicit use and forgery since the checks are drawn or received by reading out the characteristic data specific for each check card. With the present check card drawing apparatus, a check can be drawn by merely inputting the data on the check card using the keyboard and various procedures such as signing the check or entering the date can be eliminated, thereby enabling quick drawing of a check.

What is claimed is:

1. A check card drawing apparatus which comprises:
   a keyboard for inputting data;
   a display means for displaying the data inputted by said keyboard;
   an insertion slit for receiving a check card and a data read-out/write-in means for reading out data written on a magnetic stripe of said check card inserted into said insertion slit and for writing data on said magnetic stripe of said check card;
   a printing means for printing data at a predetermined position on said check card;
   a memory for storing an account number specifically assigned to the check card drawing apparatus;
   an ejection slit for ejecting said check card; and
   a control means for controlling said keyboard, said display means, said data read-out/write-in means, said memory and said printing means and for controlling and conveying said check from said insertion slit to said ejection slit for ejecting said check card;
   wherein the account number which was previously recorded on said magnetic stripe of said check card is read out by said data read-out/write-in means and checked against said account number stored in said memory.

2. A check card drawing apparatus as claimed in claim 1, wherein said keyboard comprises ten-keys and symbol keys.

3. A check card drawing apparatus as claimed in claim 1, wherein said insertion slit is located at a position which is different from that of said ejection slit.

4. A check card drawing apparatus as claimed in claim 1, wherein said insertion slit doubles as said ejection slit.

5. A check card drawing apparatus as claimed in claim 1, wherein said check card has an identification area.

6. A check card drawing apparatus as claimed in claim 5, further including a measuring means for detecting characteristic data disposed in said identification area.

7. A check card drawing apparatus as claimed in claim 6, wherein said measuring means comprises a light emitting element and a photo-sensitive element.

8. A check card drawing apparatus as claimed in claim 1, wherein the check card apparatus is portable and compact.

9. A check card apparatus as claimed in claimed 1, wherein said check card is a rectangular sheet.

* * * * *